US012287771B2

(12) United States Patent
Lakshman et al.

(10) Patent No.: US 12,287,771 B2
(45) Date of Patent: *Apr. 29, 2025

(54) HIGH DENSITY DATA STORAGE BASED ON LOG STRUCTURED STORAGE TECHNIQUES

(71) Applicant: Couchbase, Inc., Santa Clara, CA (US)

(72) Inventors: Sarath Lakshman, Mahe (IN); Apaar Gupta, Bangalore (IN); Rohan Ashok Suri, Mumbai (IN); Scott David Lashley, Portland, OR (US); John Sae Liang, Palo Alto, CA (US); Srinath Duvuru, Portland, OR (US); David James Oliver Rigby, Manchester (GB)

(73) Assignee: Couchbase, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/223,540

(22) Filed: Jul. 18, 2023

(65) Prior Publication Data
US 2024/0028575 A1  Jan. 25, 2024

(30) Foreign Application Priority Data
Jul. 20, 2022 (IN) .............................. 202241041486

(51) Int. Cl.
*G06F 16/22* (2019.01)
*G06F 12/02* (2006.01)
(Continued)

(52) U.S. Cl.
CPC ...... *G06F 16/2246* (2019.01); *G06F 12/0253* (2013.01); *G06F 16/2358* (2019.01);
(Continued)

(58) Field of Classification Search
CPC ............ G06F 16/2246; G06F 12/0253; G06F 16/2358; G06F 16/24552; G06F 16/24561; G06F 16/93; G06F 16/9027
(Continued)

(56) References Cited

U.S. PATENT DOCUMENTS 9,460,008 B1 * 10/2016 Leshinsky ........... G06F 12/0253
10,013,440 B1 * 7/2018 Gupta ..................... G06F 16/10
(Continued)

FOREIGN PATENT DOCUMENTS

WO  WO-2021061173 A1 *  4/2021

OTHER PUBLICATIONS

O'Neil, P. et al. "The log-structured merge-tree (LSM-tree)," Acta Informatica, vol. 33, Jun. 1996, pp. 351-385.
(Continued)

*Primary Examiner* — Hicham Skhoun
(74) *Attorney, Agent, or Firm* — Fenwick & West LLP

(57) ABSTRACT

A system uses a hybrid key-value storage engine that uses log-structured merge tree and a segmented log-structured object store. The system performs garbage collection of stale document versions avoiding index lookup during log segment compaction. The system separates index and document data to minimize write amplification. The system maintains a delete list using a log-structured merge-tree to store stale document sequence numbers and corresponding sizes per log segment. For each log segment from the plurality of log segments, the system determines a measure of fragmentation of the log segment based on sizes of deleted documents of the log segment from the second log-structured merge-tree. If the fragmentation exceeds a threshold, the system initiates a compaction operation for the log segment.

20 Claims, 14 Drawing Sheets

(51) Int. Cl.
  *G06F 16/23* (2019.01)
  *G06F 16/2455* (2019.01)
  *G06F 16/93* (2019.01)
(52) U.S. Cl.
  CPC .. *G06F 16/24552* (2019.01); *G06F 16/24561* (2019.01); *G06F 16/93* (2019.01)
(58) Field of Classification Search
  USPC .......................................................... 707/813
  See application file for complete search history.

(56) References Cited

U.S. PATENT DOCUMENTS

| | | | |
|---|---|---|---|
| 10,445,022 B1* | 10/2019 | Qui | G06F 3/0661 |
| 11,030,242 B1* | 6/2021 | Borthakur | G06F 16/951 |
| 2010/0082547 A1* | 4/2010 | Mace | G06F 16/1748 |
| | | | 707/648 |
| 2016/0110403 A1* | 4/2016 | Lomet | G06F 16/2255 |
| | | | 707/695 |
| 2017/0109421 A1* | 4/2017 | Stearn | G06F 16/258 |
| 2021/0081396 A1 | 3/2021 | Tian | |
| 2022/0245150 A1* | 8/2022 | Delbru | G06F 16/24544 |

OTHER PUBLICATIONS

PCT International Search Report and Written Opinion, PCT Application No. PCT/US2023/028103, Oct. 30, 2023, 16 pages.
Vo, H.T. et al. "Logbase: A scalable log-structured database system in the cloud," Proceedings of the VLDB Endowment, vol. 5, No. 10, Jun. 30, 2012, pp. 1004-1015.

* cited by examiner

HIGH DENSITY DATA STORAGE BASED ON LOG STRUCTURED STORAGE TECHNIQUES

CROSS REFERENCE TO RELATED APPLICATION

This application claims the benefit of Indian Provisional Application No. 202241041486, filed Jul. 20, 2022, which is incorporated by reference in its entirety.

FIELD OF ART

This disclosure relates in general to databases, and in particular to a high-density data storage system based on log-structured merge trees and log-structured object storage.

BACKGROUND

Modern-day internet-scale interactive applications generate huge amounts of data through user engagements. These data-intensive applications such as internet-of-things, messaging applications, and online gaming perform frequent writes, thereby requiring large storage capacity. As a result, distributed databases that can scale horizontally have become an integral part of the modern data infrastructure stack that needs to operate at scale. The rapid growth of data volumes has introduced challenges from a manageability and storage cost perspective. The high throughput and storage capacity can be achieved by scaling out the distributed database by adding more nodes. However, there is significant cost associated with adding nodes to scale the distributed system. Furthermore, depending on the type of application being executed by the distributed system, there may be increased cost of communication between nodes as additional nodes are added. To maintain a reasonable cost of ownership, there is a need to improve storage efficiency in handling large data volume per node instead of relying on horizontal scaling by adding nodes.

SUMMARY

Embodiments of a disclosed system, computer-implemented method, and computer readable storage medium use a write-optimized high data density key-value storage engine. The system uses a hybrid key-value storage engine that combines log structured merge trees (LSM Trees) and a segmented log-structured object storage. The system performs efficient garbage collection of stale document versions. The system separates index and document data to minimize write amplification. The storage engine also performs a scalable and incremental compaction.

According to an embodiment, the system stores a set of documents in log-structured object store comprising sequence numbers and document values. The log-structured object store stores documents of the set of documents in a sorted order and comprises an index for accessing a document given a sequence number. The system stores a log-structured merge tree that maps keys to sequence numbers for accessing documents of the set of documents. The system receives a query statement for querying a database that is managed by the data management system. The query statement specifies a key. The system searches the key in a cache memory. If the key is not found in the cache memory, the system searches for the key in the log-structured merge tree. The system obtains a document sequence number by matching the key from the log-structured merge tree. The system obtains a document value from a log-structured object store that maintains documents sequence numbers and document values. The system returns the document value to the requestor. The write amplification in the LSM tree is minimized by separating the storage of the sequence number from document values.

According to an embodiment, the system stores a first log-structured merge-tree mapping keys to sequence numbers for accessing documents of the set of documents and maintains a delete list using a second log-structured merge-tree. The delete list comprises a list of stale document sequence numbers and corresponding sizes per log segment. For each log segment, the system determines a measure of fragmentation of the log segment based on sizes of deleted documents of the log segment from the second log-structured merge-tree. If the fragmentation exceeds a threshold, the system initiates a compaction operation for the log segment. The system is able to efficiently determine the measure of fragmentation of the log segment based on the delete list using a second log-structured merge-tree.

The processes disclosed herein may be executed using one or more computer processors. Embodiments include non-transitory storage media storing instructions that cause one or more computer processes to perform steps of the processes disclosed herein. Embodiments include, computer systems including computer processors and non-transitory storage media storing instructions of the processes.

Figure 1:
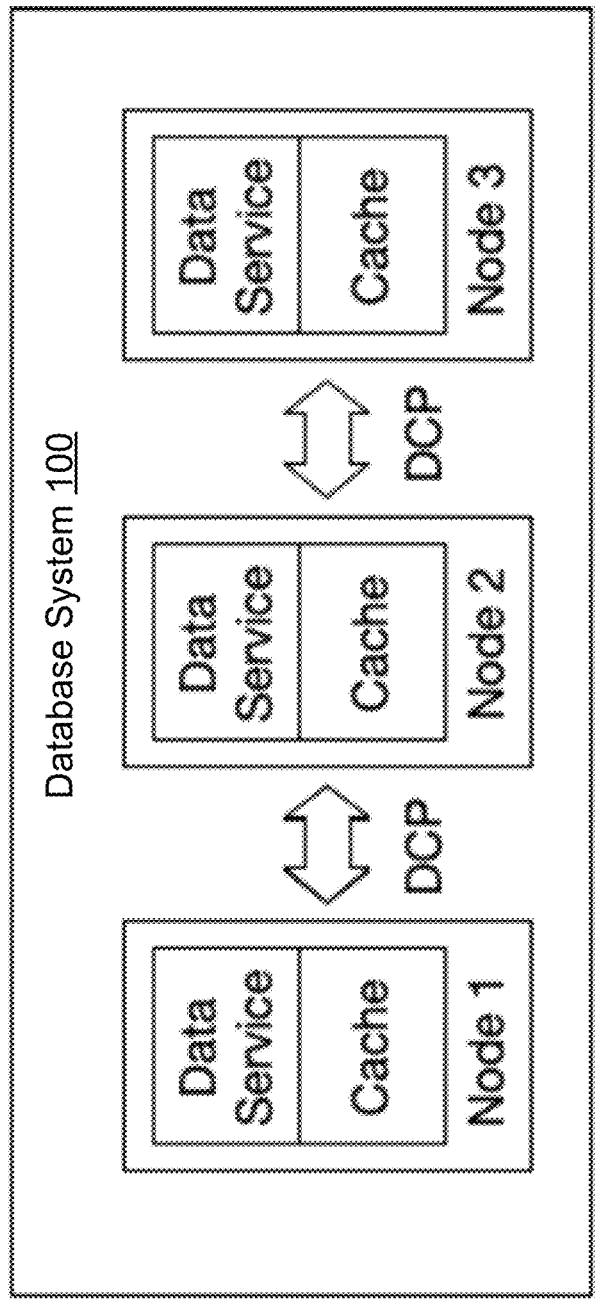
FIG. 1 shows an overall architecture of a distributed database system according to an embodiment.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "115a," indicates that the text refers specifically to the element having that particular reference numeral. A reference numeral in the text without a following letter, such as "115," refers to any or all of the elements in the figures bearing that reference numeral.

DETAILED DESCRIPTION

Distributed databases that scale out horizontally by adding more nodes can be used to serve the requirements of applications requiring large amount of storage. However, there is significant cost to adding nodes to a distributed system. Embodiments of the system improve storage efficiency in handling large data volume per node, thereby allowing storage capacity to be increased without having to add additional nodes. The system supports higher data density and higher write throughput by using a storage engine architecture that lowers write amplification and avoids expensive compaction operations that rewrite the whole database.

The figures below depict various embodiments for purposes of illustration only. One skilled in the art will readily recognize from the following discussion that alternative embodiments of the structures and methods illustrated herein may be employed without departing from the principles of the embodiments described herein.

FIG. 1 shows an overall architecture of a distributed database system according to an embodiment. Other embodiments may have more, fewer, or different components than shown in FIG. 1. The database system 100 uses microservices for scaling the database. The database system 100 uses several distributed services, for example, data service for storing primary document storage, indexing service for global secondary indexes, query service for providing query language compute, event service for database triggers, and so on. FIG. 1 illustrates the details of data service. Data service includes several nodes responsible for distributed storage of documents. The data service provides a high performance, replicated, elastic distributed key-value store service.

A database may be referred to herein as a bucket. A bucket is internally split into multiple (e.g., 1024) logical partitions called vBucket (also referred to as a bucket partition). The partitioning scheme may be based on a hash function, for example, CRC32 hash. A document is mapped to a fixed vBucket hashed by its key. vBuckets are distributed among several server nodes and are redistributed among the cluster of nodes when nodes are added or removed according to the cluster capacity. Each vBucket may be replicated to multiple nodes. Documents belonging to a vBucket are stored in a single node key-value storage engine.

The vBucket key-value store supports various features that can be invoked using application programming interfaces (APIs). A write document API receives as input, a list of documents and persists it to the key-value store. Every document update has a monotonically increasing sequence number generated by the data service. A read document API performs a batch read of a list of documents referenced by the document key. These are individual key lookup operations. A change feed API exposes a change log interface to the vBucket. It provides an ordered stream of document mutations by sequence number. This change log is a backend for several services within the database to consume changes and keep them in sync with the document changes. A rollback API allows to revert the database to a prior checkpointed state. Accordingly, the database keeps few prior checkpoints of the data in-order for rollback to go back in time and revert to the older version. The vBucket key-value store uses single writer, multiple readers concurrency model.

Figure 2:
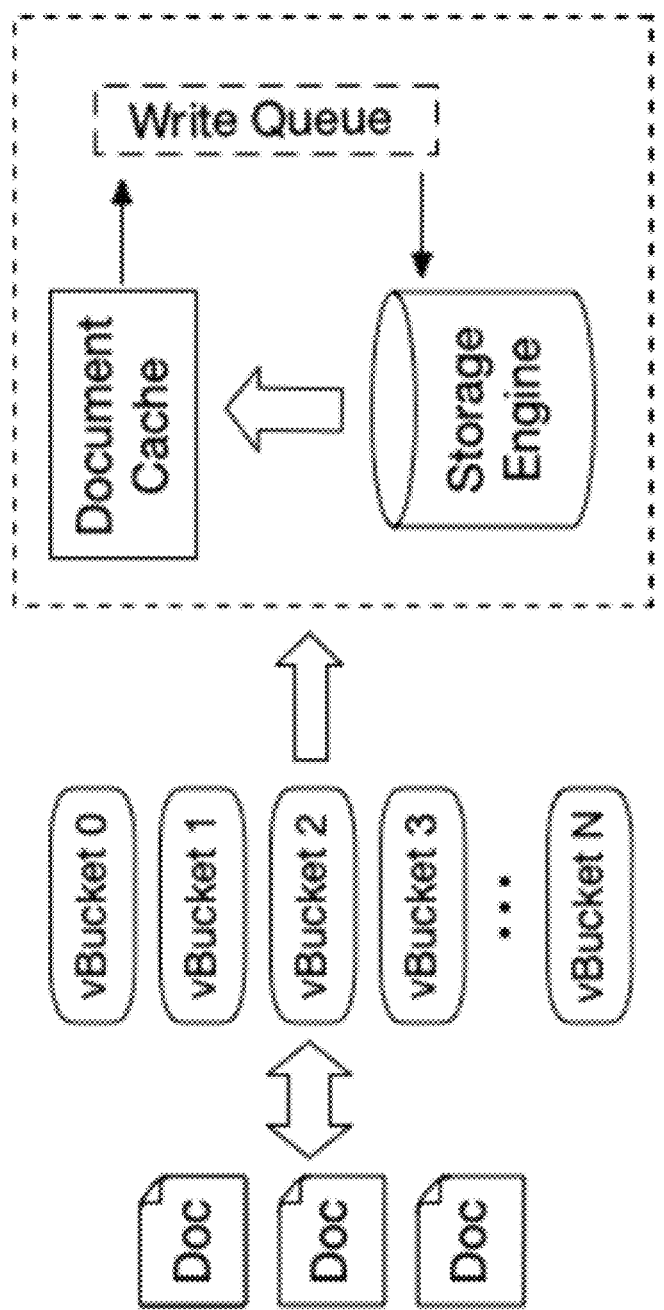
FIG. 2 shows the interactions between various components of the database system according to an embodiment.

FIG. 2 shows the interactions between various components of the database system according to an embodiment. The data service maintains an in-memory hash table based document cache for each vBucket. The actively read and recently written documents are stored in the cache. Each document in the cache can be retrieved by the document key of the document. If the document is not present in the cache, the system retrieves the document using the key-value store.

Any mutation that happens to the documents is propagated to several other parts of the system, including data replication, indexes, event service, etc. The system uses a database change protocol (DCP) that allows the internal database services an interface to subscribe to document changes from a particular point-in-time to latest. The most recent changes are buffered in memory on every node of the data service. If the changes are old and not present in memory, the changes are sourced through vBucket key-value storage engine via change feed API.

According to an embodiment, the system implements a copy-on-write B+Tree (also referred to as COW B+Tree) that is an adaptation of B+Tree for log structured storage model. Compared to update in place B+trees, the copy-on-write B+Trees achieves higher write throughput as it performs writes in a sequential access pattern. The log structured write model performs better for spinning disks as well as SSDs. B+Tree comprises intermediate pages and leaf pages. The leaf page stores key record pairs and intermediate pages store key-value pairs with value being the file offsets of pointing pages within the same file.

According to an embodiment, the system implements a B+Tree modification that involves read-modify-write scheme for the B+Tree page. When a record needs to be added or removed to the copy-on-write B+Tree, the system locates the leaf page where the record key belongs by traversing the tree from root page, navigating through the intermediate nodes. The system makes a copy of the page in-memory and makes the modification in the page to add or remove the record. The new version of the page is appended to the database file. Since the location of the leaf page has changed to a new offset, the system updates the intermediate node that points to the leaf node. Similarly, all the intermediate pages up to the root page are rewritten to update the new page locations.

If a record is modified or added, the system may have to copy a leaf node, an intermediate node, and root node. The older version of the pages become stale in the file as the current B+Tree points to the recently updated pages. The modification in the page is performed in the units of a single page. Therefore, even if a single record is added or removed, the page in the unit of disk block size needs to be rewritten. Every leaf page modification results in multiple pages to be rewritten thereby causing write amplification.

The system reduces the write amplification cost by batching of writes. Instead of rewriting a B+Tree page for one modification, with large batching multiple records that falls into the same page, the system performs the modification in a single rewrite. The rewrites of several intermediate pages may also be combined. The system performs write queuing and deduplication before applying a batch of updates to the B+tree to reduce write amplification.

To read from the B+Tree, the system determines the root B+Tree page offset of the current version of the tree. From the root page, the system determines the file offsets for the intermediate pages and further locates the leaf page.

Since the system follows append-only storage model for writes, every insert, update or deletion operation in the B+Tree results in multiple page rewrites. Each modify operation generates few new pages while making the older versions of the pages stale. These stale versions are still present in the database file. As more data is written, the database file grows in size. To reclaim the space occupied by the stale pages, the system performs defragmentation or compaction. The B+Tree metadata maintains the size of the current live B+tree in the file. Once the stale data size grows above a fragmentation threshold compared to the database file size, the system performs compaction.

The system performs a compaction operation using a background thread. The system obtains the current B+tree root offset and opens a B+tree iterator. The system opens a new database file and performs a B+Tree bulk load operation to the new file to rebuild the B+tree. While the compaction is running, the writes may be still ongoing with the old database file. The compactor operates on a point-in-time version of the B+tree. After finishing the B+Tree bulk load, the system runs a catchup phase to replay over the new additions/deletions that happened to the B+Tree from the point-in-time version used by the compactor up to the latest B+Tree in the database file. On completion of the catchup phase, the old database file is removed, and writers and readers switch to the new database file. The space is reclaimed.

Figure 3A:
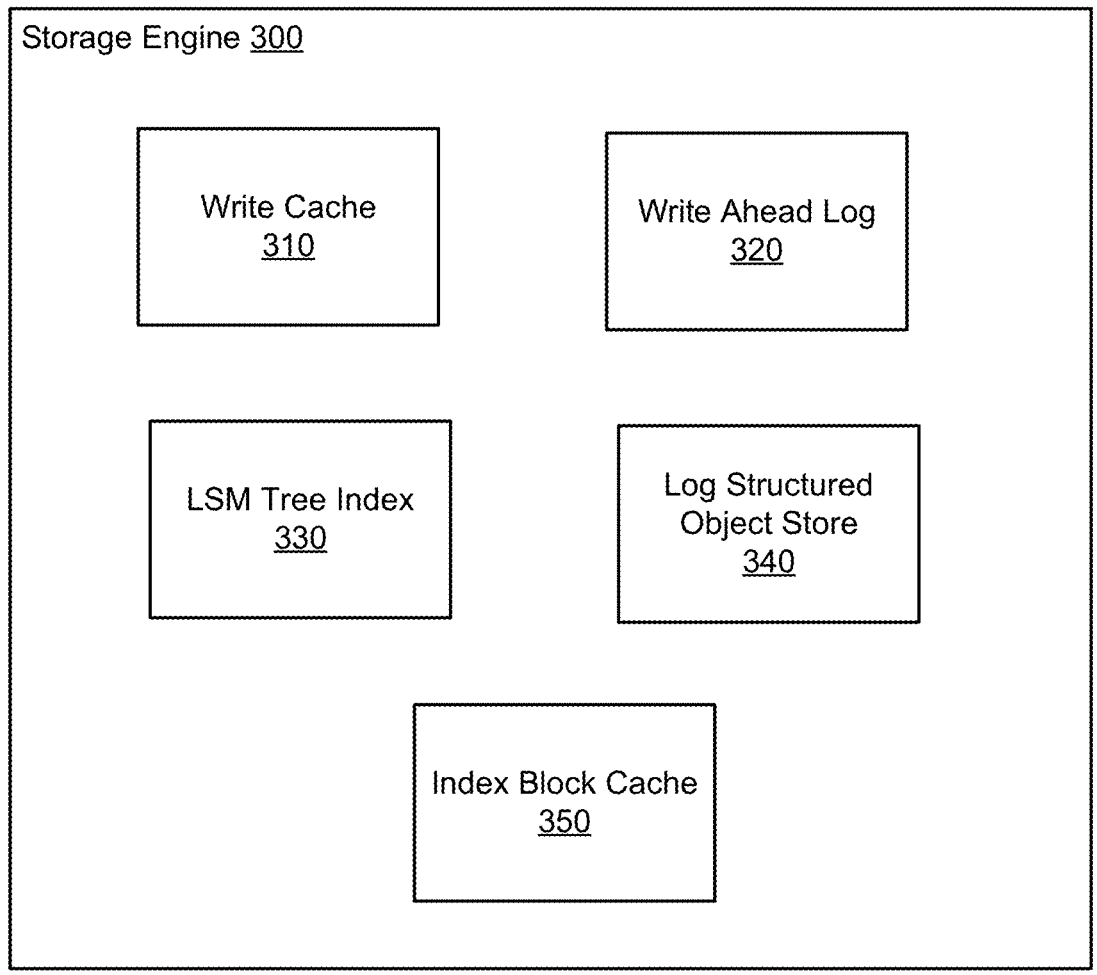
FIG. 3A shows the system architecture of a key-value storage engine according to an embodiment.

FIG. 3A shows the system architecture of a key-value storage engine according to an embodiment. The key-value storage engine includes a write-cache 310, a write-ahead log 320, a LSM tree index 330, a log structured object store 340, and an index block cache 350. The storage engine follows a log-structured storage model which is optimized for point lookups by key as well as providing a changelog from the database efficiently. The storage engine design puts emphasis on storage efficiency to achieve performance with large database size to achieve high data density per node. The storage engine achieves high write transaction throughput by maintaining low write amplification, scalable compactions while not regressing on the read performance.

Figure 3B:
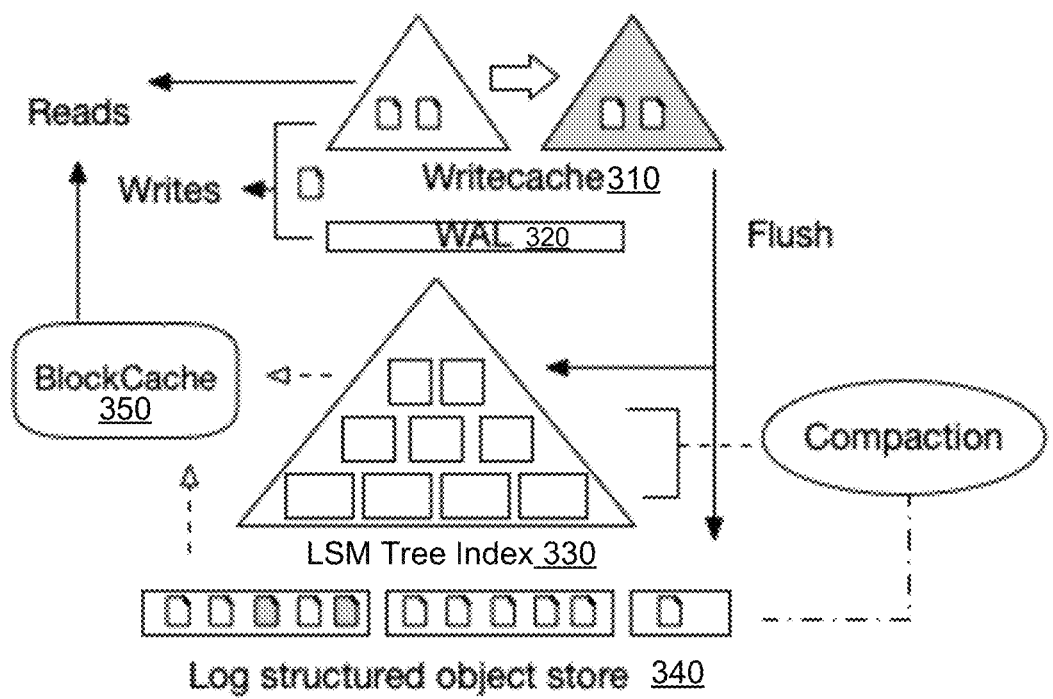
FIG. 3B shows the interactions between different components of the system architecture of a key-value storage engine according to an embodiment.

FIG. 3B shows the interactions between different components of the system architecture of a key-value storage engine according to an embodiment.

The write-cache 310 is an in-memory component used to buffer key-value pairs and provide large sequential writes to the persistent storage. The write-cache is also used during lookup for key-value pairs. The write cache may be implemented using a lock-free skip list. Fixed memory is configured for the write-cache and is internally split into two skip lists as active and immutable. When the system reaches the configured memory limit, the cache is flushed to the key index and log-structured object storage on the SSD.

The write-ahead log (WAL) 320 is an append-only log where the incoming key-value pair writes are initially written to provide durability. Writes are initially buffered in the write-cache and also written to the write-ahead log. The write API returns only after issuing an fsync (file sync operation) on the write-ahead log file. Periodically, the space used by the write-ahead log is reclaimed when the write-cache is flushed.

The LSM Tree index 330 is an index for the documents stored on a log structured object store is organized as an LSM Tree. The LSM Tree index stores document key, document sequence number, and size metadata as key-value pairs. For document read operations, the LSM Tree is initially looked up to obtain the document sequence number which is used to read the document value from the log-structured object storage. The LSM tree index maintains bloom filters to optimize the lookup I/O.

The log-structured object store 340 provides persistent storage for the documents by organizing them on an append-only segmented log. The log-structured store maintains an index that allows querying of a document by sequence number. The log-structured store also allows range query by sequence number essentially providing a changelog for the document database.

The index block cache 350 is a read cache that is maintained in RAM for caching the recently read index blocks from the LSM Tree as well as the log-structured object store. According to an embodiment, a least recently used (LRU) eviction policy is used to manage the cache. This cache does not keep the actual document data, but only the index blocks used to locate the documents on log-structured storage. The system maintains a vBucket level document cache. This object-level managed cache is more efficient than block-level cache for document objects. The unit of caching in a block cache is of size, 4 KB. The document cache can perform the caching at a single document level and avoid wasting memory for keeping cold documents grouped in a physical block on the SSD.

In one embodiment, the storage engine includes a byKey Index (also referred to as a key index), a bySeq Index (also referred to as a sequence index), and a value store. The byKey Index serves the purpose of answering point-lookup based on document key. The bySeq index receives and processes range queries based on document sequence based ranges for a vBucket.

Figure 4:
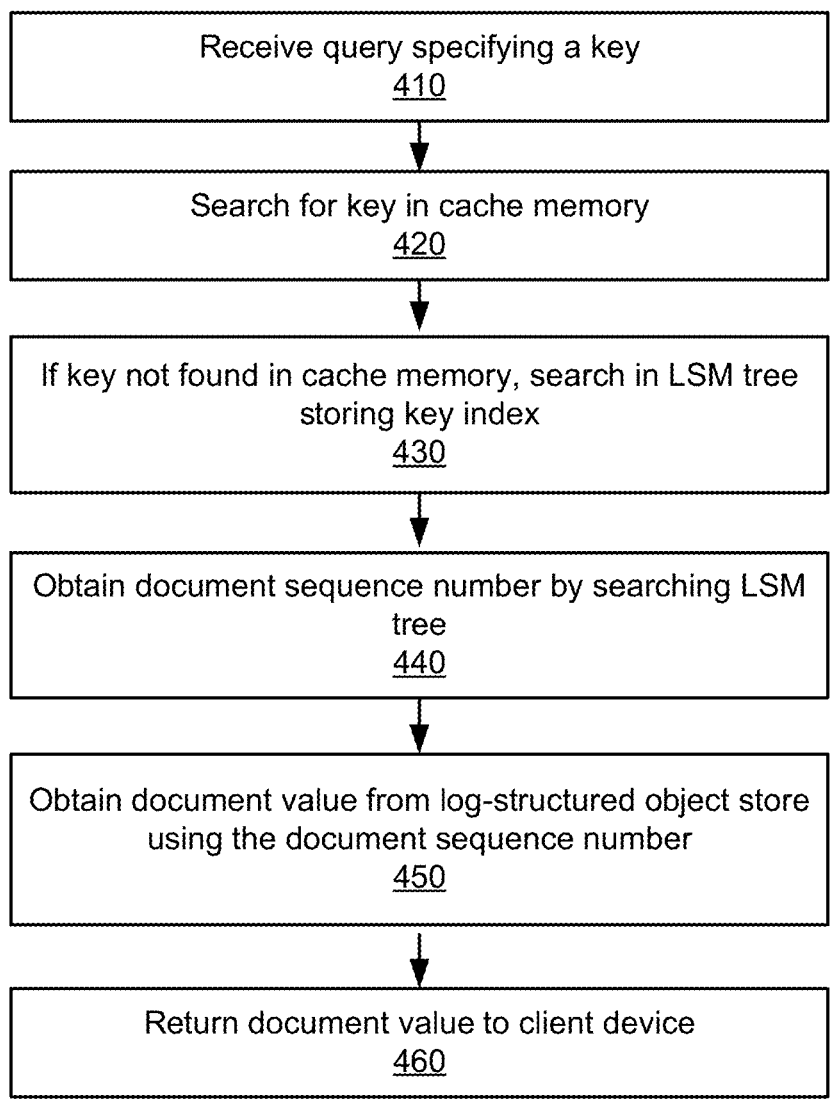
FIG. 4 shows a flowchart illustrating a process for processing queries according to an embodiment.

FIG. 4 shows a flowchart illustrating a process for processing queries according to an embodiment. The system receives 410 a query for accessing data from the database. The query specifies a key. The query may be received from a client device. The system searches 420 for the key in the cache memory. If the system finds the key in the cache memory, the system accesses the value corresponding to the key from the cache and returns the value to the client device as the result of the query. If the key is not found in the cache the system searches for the key using the byKey index represented as an LSM tree. The system obtains a document sequence number from the byKey index. The system further searches for the document in the log-structured object store using the document sequence number. The system obtains a document value from the log-structured object store using the document sequence number. The system returns the document value to the client device that sent the query.

Figure 5:
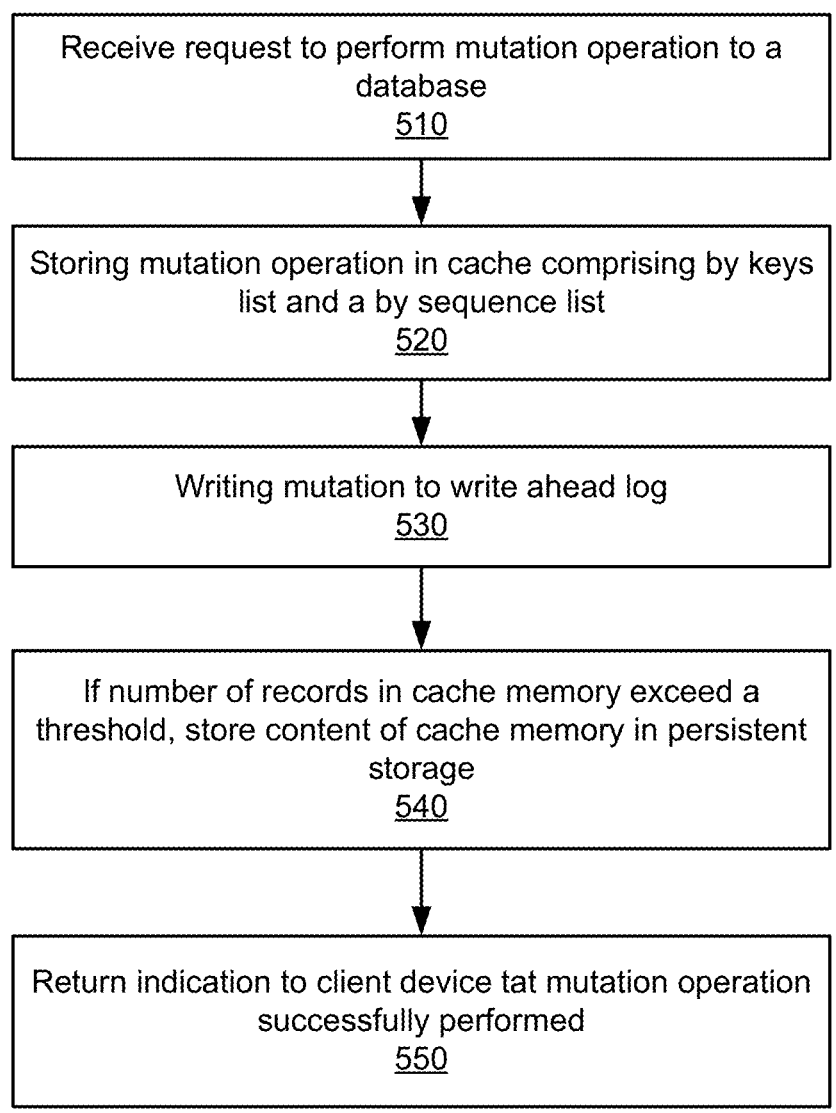
FIG. 5 illustrates the process of performing mutations on the database, according to an embodiment.

FIG. 5 illustrates the process of performing mutations on the database, according to an embodiment. The system receives, from a client device, a request to perform a mutation operation to a database that is managed by the system. The system stores information describing the mutation operation in a cache memory. The system maintains two lists in the cache memory, a list indexed by keys and a list indexed by sequence numbers. The system writes the mutation to a write-ahead log.

The system tracks the number of mutation records in the cache memory. If the number of records stored in the cache memory exceed a threshold, the system stores the content of the cache memory in a persistent storage. This operation is performed by (1) converting key-value pairs into key index for a log-structured merge tree (LSM tree) and (2) appending documents to a tail log-segment of a log-structured object store. The system clears the cache memory and returns an indication to the client device that the mutation operation has successfully performed to the database.

Figure 6:
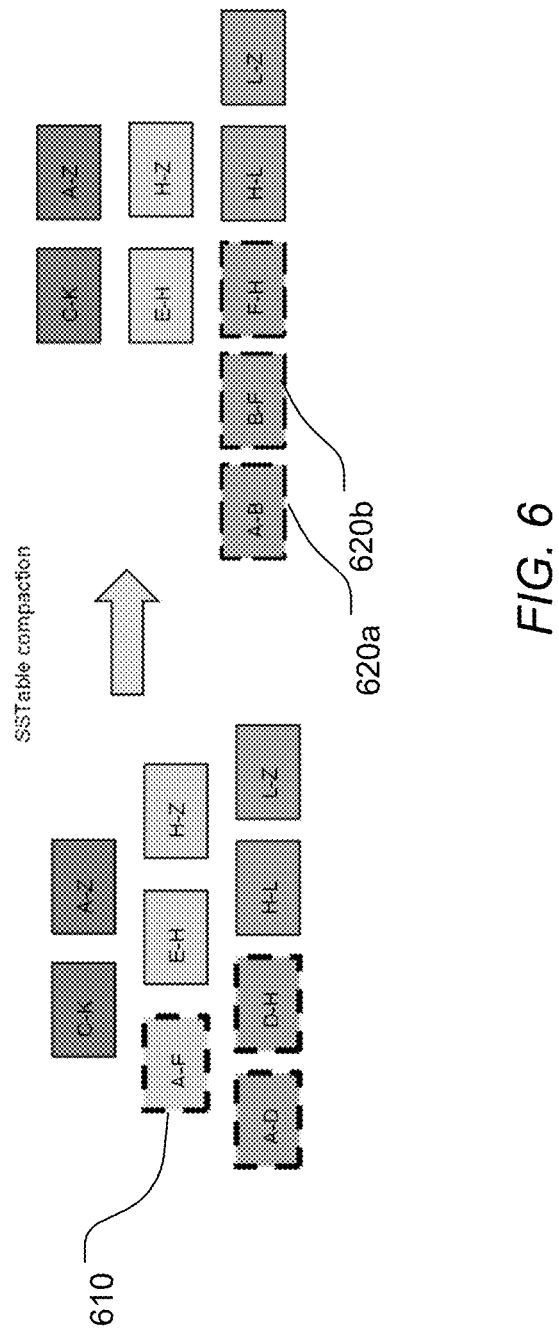
FIG. 6 illustrates the process of compaction using an example, according to an embodiment.

FIG. 6 illustrates the process of compaction using an example, according to an embodiment. FIG. 6 shows the LSM tree before and after compaction. As illustrated in FIG. 6 the intermediate node 610 is identified and merged with the leaf level nodes 620a and 620b.

The system uses LSM Tree for implementing the byKey index. If the document value is placed along with the key in the byKey index, when LSM Tree runs compaction operations to maintain the tree balance for read and space amplification, a value gets rewritten many times (Up to 40 times for a 4 level tree). To overcome unnecessary write amplification, the storage engine places values in a separate log structured storage and uses sequence number based logical addressing. Instead of actual values, a value pointer is stored in the byKey index in the place of value along with the key. The system maintains a separate storage system tuned for storing large values. When the value storage internal segments (unit of storage) become fragmented, the system cleans the segments by rewriting the values to a new segment. Since a value pointer is a physical offset derived based on a segment's position within the blocks of the segment, when valid values are rewritten to a new segment, the original value pointers become invalid. For valid values, the system updates the corresponding value pointer offsets in the byKey Index. While cleaning a value store segment, the system determines whether each value is valid or not by performing a lookup into the byKey index. This involves an I/O (input/output) operation per value.

When documents are added to a key-value store (kvstore), an entry <key, value> or <key, value_pointer> is added to byKey index and <seq, key> is added to bySeq index. When a document is updated multiple times, they are pushed into the byKey index as two update operations. The system does not explicitly create a (delete old key, insert new key) and (delete old seq, insert new seq) operations. By not fetching the previous document version during update, the system saves an extra I/O operation required to fetch the old document. During the compaction operation, multiple versions for the same key are garbage collected.

For example, assume that the system updates document with key "a" multiple times. (a, seq=1, v=v1), (a, seq=10, v=v2), (a, seq=100, v=v3). The system identifies three entries for "a" while performing compaction and picks the latest version, which is (a, seq=100, v=v3). The other two versions are discarded.

The system asynchronously propagates deletes to bySeq index as well as value store. The garbage collection callback adds deletes for sequence numbers=[10 and 100] to be deleted from bySeq index. Similarly, value store uses value_pointer to mark the delete bitmaps.

When a document is updated or deleted, an entry is added to the bySeq index. From application perspective, every new update or delete operation generates a monotonically incrementing sequence number. Accordingly, the bySeq index is implemented as a log that always grows at the tail. When compaction is performed for byKey index, it generates a list of seq numbers to be removed from the bySeq index. The byKey Index provides a facility for lazy deletion of entries from the bySeq index. The system uses an LSM Tree for the bySeq index and a memory table (write cache) accumulates operations to be applied for the LSM Tree. Both update mutations as well as delete sequence entries coming from the byKey LSM Tree compaction are accumulated by the memory table. Once the memory table becomes full, the operations of the memory table are written out to level-0 and as levels become bigger, they get compacted to the next level and so on until it reaches the final level.

Since, new entries are always added at the tail according to the monotonically incrementing sequence numbers, the data structure used for storing the new entries is represented as a log.

Figure 7:
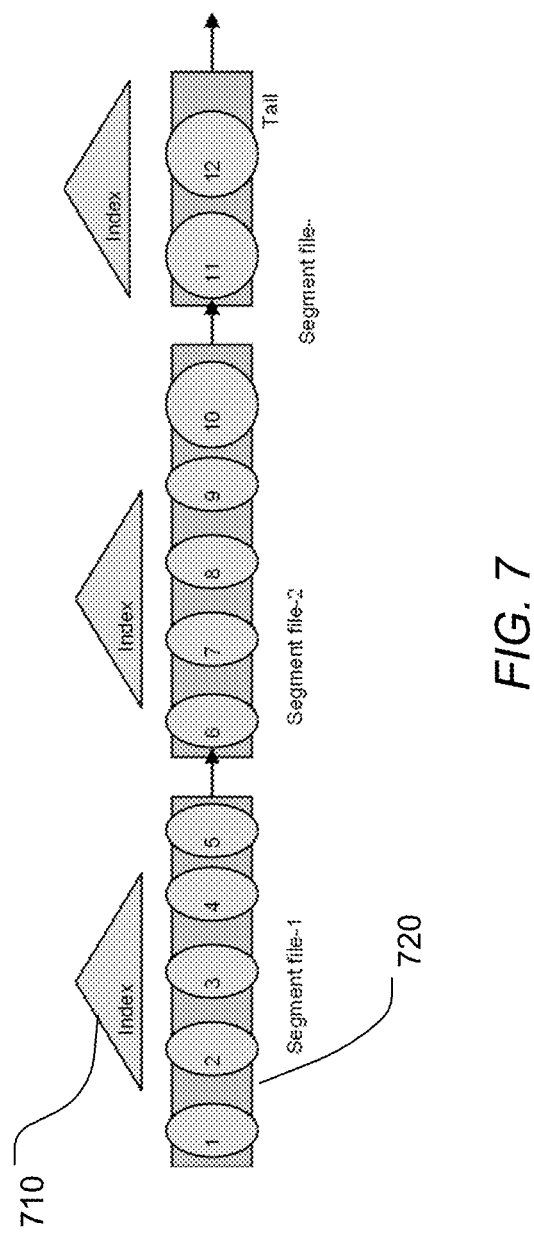
FIG. 7 illustrates the log structure object store representation of the database according to an embodiment.

FIG. 7 illustrates the log structure object store representation of the database according to an embodiment. The log structure object store comprises multiple log segments 720. Each log segment 720 has an index 710 by sequence number to fetch entries of the log.

The system uses a segmented append only log for document storage. All mutations of the documents and deletions of the documents (tombstones) are appended in this log. Each document version or modification has a unique sequence number generated by the server. The log comprises log segments with predefined sizes. The storage engine maintains a tail log file. As writes occur, document mutations are appended to the tail log. Once the tail log file reaches the size threshold, a current log file is made immutable, and a new tail log file is initialized. A tail log file may also be referred to herein as a log segment.

The stored documents in the log are also indexed by the document mutation sequence number. The indexing scheme is based on copy-on-write B+Tree. Since the inserts are keyed by sequence number and the writes always happen in monotonic order, the index structure doesn't incur significant write amplification. The system uses ssTable representation for log segment implementation. An ssTable is also referred to as a sorted string table. The list of log segments along with starting and ending sequence numbers are maintained in memory. The ssTable uses a BTree or B+Tree representation and may use a bloom filter to determine whether a record or a document is present in the ssTable or not. For each document, the ssTable stores the key or a sequence number to identify the document. For any read operation for documents, the system looks up the in-memory sorted list to locate the log segment. Then, the system uses the ssTable B+Tree to locate the document from the log segment. The tail log segment can be viewed as a streaming ssTable where new documents are always appended on writes. Since the key is sequence number of 64 bytes, the size of the index B+tree is small compared to the total data stored in the log. Since the document versions are stored contiguously on SSDs via large size log segments, the database change log API issues large sequential reads from the SSD. Hence, the system achieves high read throughput.

When a document is updated multiple times, the system generates different versions with unique sequence numbers. The log can contain multiple versions of the same key. When a new version is appended, the older versions of the same document are considered stale. The system garbage collects stale versions to reclaim space.

Similar to the in-memory component used by an LSM tree, the log-structured object store uses a write buffer to issue large writes to the tail log segment. This also limits the write amplification of the index B+tree as a larger number of records are always filled within B+tree pages.

Figure 8:
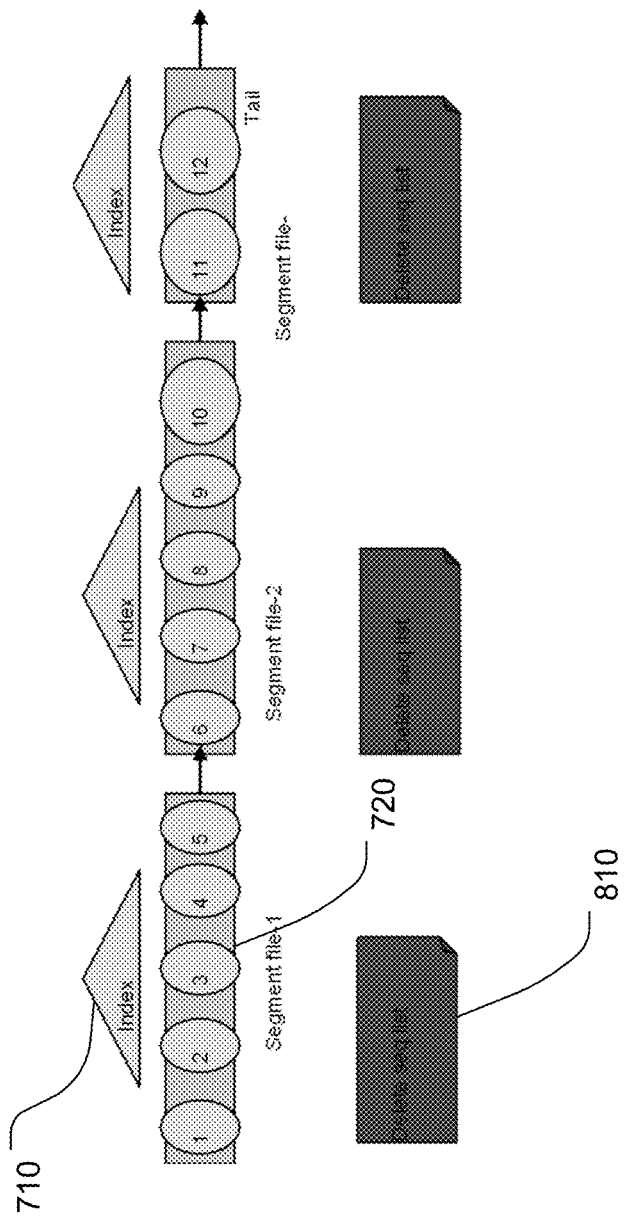
FIG. 8 illustrates use of a delete list for performing delete operations according to an embodiment.

FIG. 8 illustrates use of a delete list for performing delete operations according to an embodiment.

The byKey index provides the list of sequence numbers to be removed during periodic compactions. The system generates a delete list 810 per segment 720 that allows the system to clean segments incrementally by using the metadata provided by the delete list. The ratio of the number of elements in the delete list vs number of entries in the segment file provides an approximate fragmentation.

The system maintains an append only sequence delete list file per log segment, that is sufficient to compute fragmentation in each log segment. When byKey index compaction occurs, delete sequences appear in random order and may span across several segments. If it spans across all the segments, it requires fsync( ) per delete list file equal to the number of segments and is very expensive. The fsync( ) operation forces a physical write of data from the cache to the secondary storage (or disk) and is therefore very expensive since it requires significant input/output (I/O). To amortize the cost of maintaining per segment delete list, the system uses an LSM Tree to store delete seq list.

Figure 9:
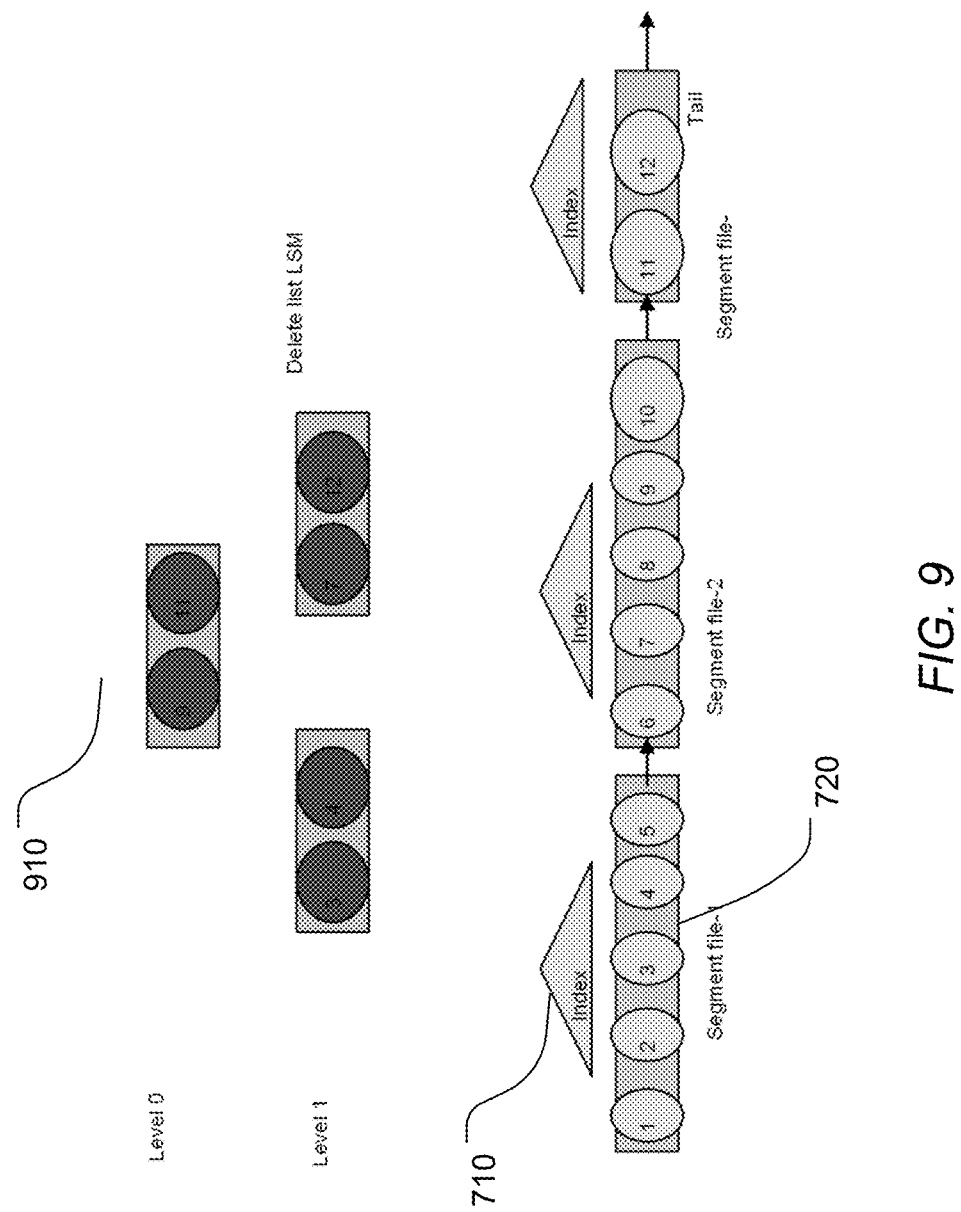
FIG. 9 illustrates the use of an LSM tree to store delete sequence list according to an embodiment.

FIG. 9 illustrates the use of an LSM tree to store delete sequence list according to an embodiment. The LSM tree 910 may store the delete sequence list using one or more levels. This allows the system to store the delete sequence number list in a cost effective manner. To obtain the list of sequence numbers to be removed, a range query is executed in the delete sequence list LSM Tree.

The system stores sorted string tables (also referred to as ssTables) based on key-value pairs. The ssTables for the delete list LSM is created when byKey index compaction is performed. As values get garbage collected during compaction, those sequence numbers along with some additional metadata can be appended to a temporary file. The same temporary file can be used across multiple compactions. Once the temporary file becomes sufficient in size, it can be sorted and a new delete list ssTable can be created. This ssTable can be directly injected to the level-0 of the delete list LSM Tree.

The specialized value store provided the ability to maintain low write amplification for large values by performing log segment garbage collection based on fragmentation in the log segments. This method avoids rewrites due to the LSM Tree multiple levels of compaction. The sequence log described above works similar to the value store. The sequence log has log segments based on a threshold size. Instead of physical log offset, sequence log provides lookup based on a sequence number facilitated by a sequence number index. If the system stores values along with the keys in the sequence log, each segment can be rewritten based on the fragmentation in the log.

According to an embodiment, the system stores value sizes along with the delete list sequence numbers. The system adds the value sizes to compute total fragmentation in a segment. An in-memory usage counter is maintained per segment. The in-memory counter is updated every time a delete list ssTable is pushed to the LSM Tree. The usage counter values for each log segment are snapshotted along with every ssTable push to the sequence delete LSM Tree.

The log segment cleaning involves querying the delete list LSM and rewriting the log segment by filtering out the sequence numbers listed by delete list query. This operation is similar to LSM ssTable compaction. These operations do not involve any expensive lookup into the byKey index (causing 1 IOP per lookup).

According to an embodiment, the overall solution is implemented as an extension of the customized LSM Tree. The level based compaction algorithm looks for overflowing levels based on level size ratio for performing compaction operation. Typical, size multiplier is 10.

Figure 10:
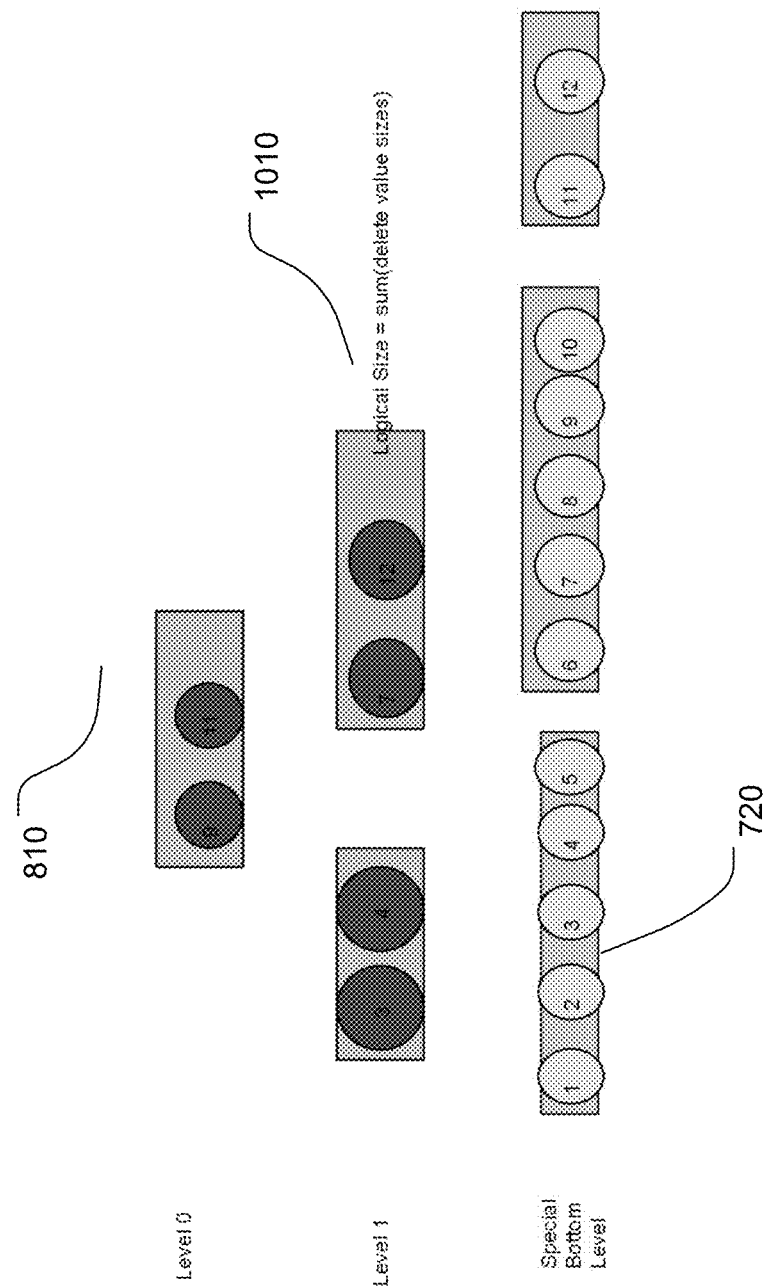
FIG. 10 illustrates determining a logical size of the delete values for determining whether to perform compaction according to an embodiment.

FIG. 10 illustrates determining a logical size of the delete values for determining whether to perform compaction according to an embodiment.

Instead of computing the size of a level based on actual ssTable file sizes, the system may compute a logical size 1010 based on the sum of value sizes (from each delete seq). This makes the delete list ssTables sizes comparable to the bottom level special log data segments. If the system does not compute logical sizes without considering value sizes, delete list level may never compact with special bottom level as the size ratios diverge widely. The delete list contains seqnum and value size (total 16 bytes) vs each corresponding key-value pair may be in KBs.

If the system merges the last level of delete LSM alone with the special bottom level, the system may rewrite some of the values which may have already marked as deleted in the upper levels of delete list LSM. So, the system performs a query on log segment sequence range on the LSM Tree to perform the log segment rewrite.

Figure 11:
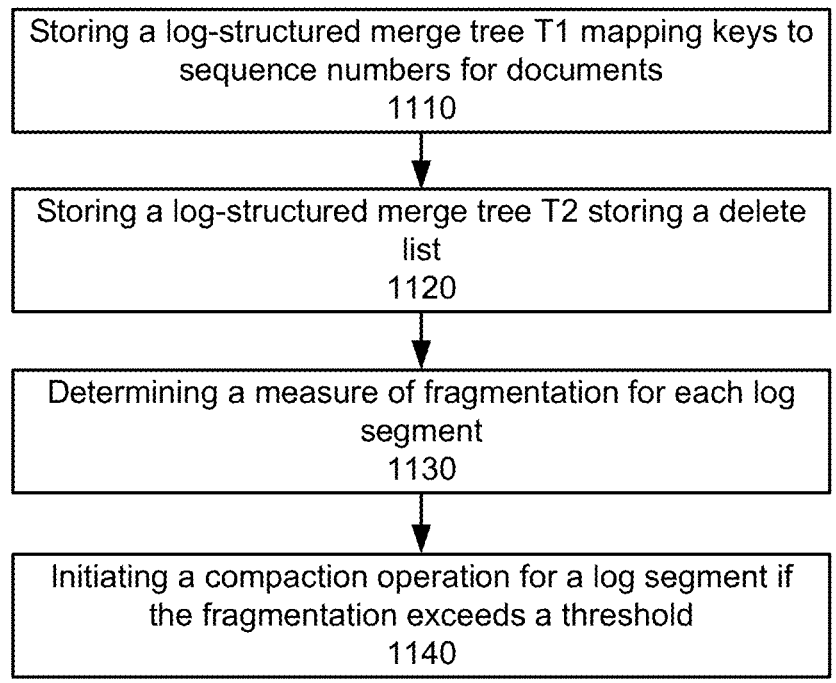
FIG. 11 shows a flowchart illustrating the process of garbage collection according to an embodiment.

FIG. 11 shows a flowchart illustrating the process of garbage collection according to an embodiment. As described herein, the system stores a set of documents in the log-structured object store and further stores 1110 a log-structured merge-tree T1 mapping keys to sequence numbers for accessing documents of the set of documents. The log-structured object store comprises a plurality of log segments. The system further stores 1120 a second log-structured merge-tree T2 for maintaining a delete list. The delete list comprises a list of stale document sequence numbers and corresponding sizes per log segment. For each log segment of the log-structured object store, the system determines 1130 a measure of fragmentation of the log segment based on sizes of deleted documents of the log segment from the log-structured merge-tree T2. If the fragmentation for a log segment exceeds a threshold, the system initiates 1140 a compaction operation for the log segment.

For log structured storage, when a record is deleted or a new version of the record is updated, the stale records are not immediately removed from the storage. A log cleaning process or compaction process is used to reclaim space. The LSM Tree key index in the system follows an LSM Tree level based compaction process to reclaim space. When each level of the LSM Tree disk usage goes above the threshold, few ssTable files from the level are picked and moved to the next level by merging with the overlapping files in the next level. The stale records or deleted records are filtered out while writing out the new set of ssTable files and space is reclaimed by deleting the prior ssTable files. For key index LSM Tree, the system may use a size multiplier (e.g., 10) for the level sizes.

The log structured object store has log segments that comprises document versions. Every time the system writes a new version of a document identified by the key, the prior version becomes stale. As a result, stale versions of the documents are located towards the head of the log, while newer versions are written towards the tail log segments. To limit the space usage to maintain stable space amplification, the system performs periodic log cleaning.

For reclaiming space, the system determines an estimate of the percentage of stale document data in the log structured store. The system initiates a compaction operation once the fragmentation of the log reaches above a threshold. The log segments are rewritten by discarding the stale document versions. The system determines an estimate of the amount of fragmentation in the log segments and also checks the validity of the document versions in the log segment during log compaction. Looking up the LSM Tree key index during the log compaction and retaining only the document versions with sequence numbers present in the key index is an expensive process as it involves CPU work for evaluating bloom filters and also involves random I/O in the key index. Random I/Os slow down the compaction process. The random I/Os can significantly consume the read bandwidth that is otherwise available for key-value store read operations.

The system according to an embodiment identifies stale versions by maintaining a logical sorted list of stale document version sequence numbers. The system may maintain a stale document sequence number list per log segment and an estimate of fragmentation per log segment. The system selects a log segment with the highest fragmentation based on the estimates and rewrites the log segment file by compacting it. The system performs the rewrite process by performing sort merge between the sorted deleted sequence number list and the documents in the log segment. The system identifies matching documents with the stale document list sequence numbers and discards them during the log segment rewrite.

The system generates the list of stale sequence numbers as follows. The key index LSM tree maintains the latest state of the database with key and sequence number pairs. When the system performs an LSM Tree compaction, multiple ssTables are merged into new ssTables and older versions or deleted key-value pairs are discarded. The system implements a callback function in the key index compaction for the discarded documents. The callback function receives the sequence number and size of the discarded document version. This callback function is invoked to populate the stale documents' sequence number list for the log structured store. The stale sequence number list is populated synchronously as the compaction is performed on the key index LSM Tree.

Maintaining an in-memory list of sequence numbers per log segment is expensive. According to an embodiment, the system uses a bitmap to mark the stale bits for the corresponding documents. The system uses an LSM Tree to maintain the stale document sequence number list. The key-value pairs in this delete list LSM Tree are sequence number and size. The size information allows computing the fragmentation efficiently. The extra space used for maintaining the delete list LSM Tree is small as it contains only an 8 byte sequence number and 4 byte size. The write amplification for maintaining this LSM tree is a small fraction of overall bandwidth consumed. Organizing the delete list as an LSM Tree has several benefits. This allows the system to reuse the LSM Tree compaction processes as well as allows the change log API to be implemented as regular range read operation from an LSM Tree.

The system implements the delete list LSM Tree on top of the log-structured storage log segments to form a master LSM Tree. Instead of using the ssTable sizes for the LSM Tree level size thresholds, the system uses a logical size using the document size information encoded in the delete list LSM Tree. Each ssTable has a logical size which is the sum of all document sizes encoded in the key-value pair. The logical size is used for computing the level size and triggering compactions. This modification normalizes the size of log segments and the delete list LSM tree ssTables. The delete list LSM Tree level size targets are also derived based on the total file size of the log-structured store.

The system uses a shared write head log to ensure durability for the write operations by logging the modification operation in the WAL while writes are buffered in the in-memory write cache. The LSM Tree maintains a metadata file to store the snapshot of the current live ssTable files. Along with the file list snapshot, the system also records the point in time WAL offset up to which the LSM Tree ssTables have recorded the data in the snapshot metadata file. Periodically a new metadata file is written out including the current live set of the ssTable files along with their footer offset. During a crash recovery, the snapshot metadata file is read to reconstruct the LSM Tree levels and the corresponding ssTables. Using the WAL offset recorded in the snapshot metadata, the system replays the document mutations from the WAL up to the end of the WAL into the write cache. Since the system uses LSM Tree index compaction to generate deleted sequence numbers list for the log structured store, the point in time consistency of the key index LSM Tree and delete list LSM Tree are maintained. When compaction is performed in key index LSM Tree, the generated stale sequence numbers list is added to the write cache of the log structured store delete list LSM Tree.

The process may crash after persisting the snapshot metadata file for key index, while the generated sequence numbers from the compaction are not yet persisted in the delete list LSM Tree. This can result in in-flight stale sequence numbers never getting garbage collected. In order to handle this case, the system makes sure that the delete list LSM Tree snapshot metadata is always persisted before persisting the key index snapshot metadata. This invariant ensures that the system never loses stale sequence numbers metadata. The system may persist the sequence numbers in delete list LSM Tree, but the compaction ssTable changes on the key index LSM Tree are not persisted during a crash. The compaction is rerun after the database recovery and the stale sequence numbers are regenerated. Adding the stale sequence numbers again to the delete list LSM Tree is an idempotent operation.

Figure 12:
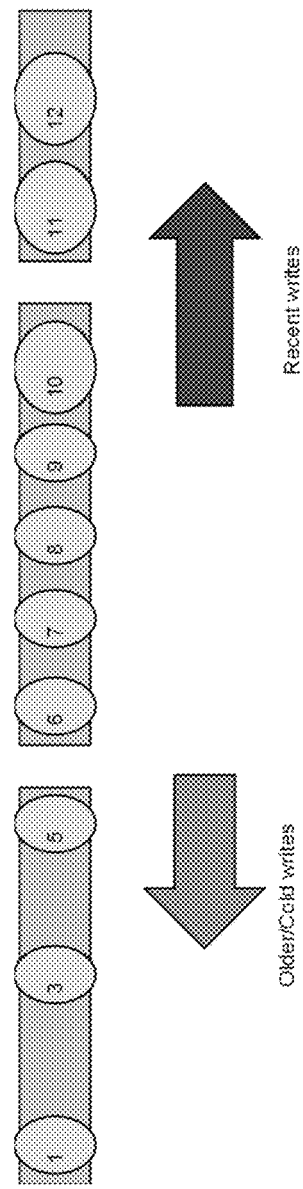
FIG. 12 illustrates storing information describing hot or cold writes according to an embodiment.

FIG. 12 illustrates storing information describing hot or cold writes according to an embodiment. The old sequence numbers belong to the old writes and higher sequence numbers correspond to the recent writes. The log follows a time series order. If few documents are modified periodically, they get rewritten often and most likely the tail end of the log accumulates garbage more often. The cleaner can pick the log segments from the tail side and rewrite them by removing obsolete values and replacing the log segment. The colder segments from the head side of the log are never rewritten unnecessarily until a certain percentage of the objects in the log segment becomes garbage.

The head side of the log behaves similar to separate cold log in special value store. The disclosed systems and methods simplify the number of moving parts in the system by unifying large value storage to sequence tree. The disclosed systems and methods save the lookup I/O per item required for value relocation (for valid items). The disclosed systems and methods eliminate duplicate key storage in value store (reduces space amplification). The disclosed systems and methods save the additional CPU required for value store writes, relocations, overhead of maintaining hot-cold classification and cleaning operation. The write amplification savings due to separate value store are also applicable in unified seq tree. For seq tree iterations, earlier lookup into keyIndex and a read from value store were required for fetching a separated item. With sequence log, an additional one I/O can be saved.

If the system maintains a delete list memory table (also referred to as a memtable), the memory table could be used to accumulate a delete list when seq tree reads are performed. When seq tree read is performed, the system merges delete list and log segments. For each valid seq item, the system checks it against the key index. If a seq is not found in the keyIndex, the system may place an insert into the delete list memory table. The delete list is populated asynchronously during seq tree reads. This is much simpler and robust than only relying on keyIndex compaction to generate ssTables for delete list. The delete list can be inconsistent and it will be auto repaired on the next set of reads.

The techniques disclosed herein improve the storage efficiency and capacity of the database system. The system allows the database to store a significantly larger amount of data per node. As a result, the database system is able to store a larger amount of data without having to add additional nodes to the distributed system. Furthermore, the system is able to achieve the same performance with significantly smaller main memory. This is achieved as a result of storing only sequence numbers in the LSM tree instead of document values. The sequence numbers occupy significantly less storage, thereby reducing the memory requirement. Furthermore, the system performs a scalable compaction that does not require rewrite of the entire database. Furthermore, the system supports much higher write rate for the database and is optimized for write operations. The system addresses the problem of write amplification that causes a much larger amount of data to be written to the storage for every write operation. The system reduces the amount of data that is written to the storage for a write operation.

Computer Architecture

Figure 13:
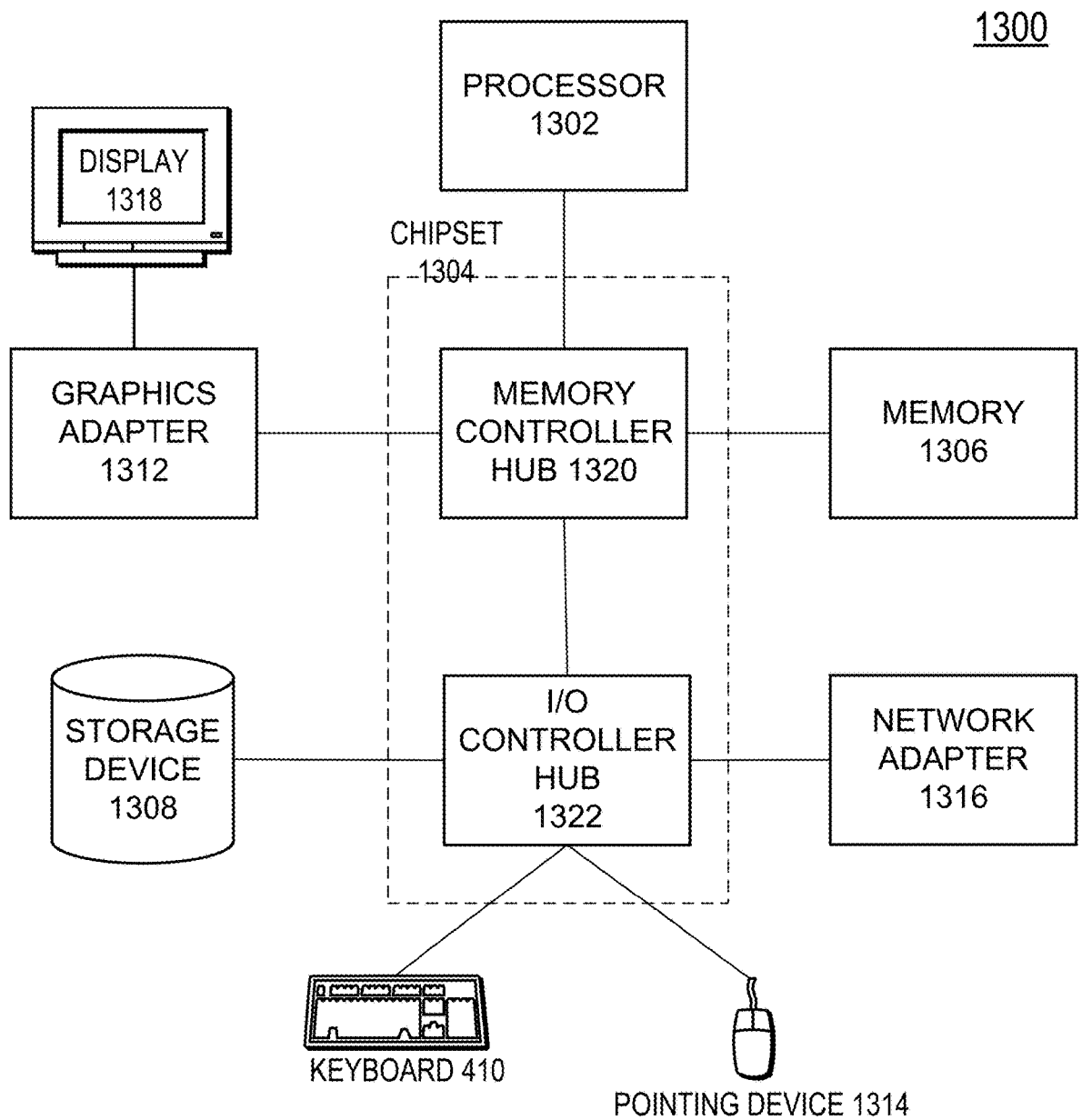
FIG. 13 is a high-level block diagram illustrating a functional view of a typical computer system according to an embodiment.

FIG. 13 is a high-level block diagram illustrating a functional view of a typical computer system according to an embodiment. Illustrated are at least one processor 1302 coupled to a chipset 1304. Also coupled to the chipset 1304 are a memory 1306, a storage device 1308, a keyboard 1310, a graphics adapter 1312, a pointing device 1314, and a network adapter 1316. A display 1318 is coupled to the graphics adapter 1312. In one embodiment, the functionality of the chipset 1304 is provided by a memory controller hub 1320 and an I/O controller hub 1322. In another embodiment, the memory 1306 is coupled directly to the processor 1302 instead of the chipset 1304.

The storage device 1308 is a non-transitory computer-readable storage medium, such as a hard drive, compact disk read-only memory (CD-ROM), DVD, or a solid-state memory device. The memory 1306 holds instructions and data used by the processor 1302. The pointing device 1314 may be a mouse, track ball, or other type of pointing device, and is used in combination with the keyboard 1310 to input data into the computer system 1300. The graphics adapter 1312 displays images and other information on the display 1318. The network adapter 1316 couples the computer system 1300 to a network.

As is known in the art, a computer 1300 can have different and/or other components than those shown in FIG. 13. In addition, the computer 1300 can lack certain illustrated components. For example, a computer system 1300 acting as a server computer may lack a keyboard 1310 and a pointing device 1314. Moreover, the storage device 1308 can be local and/or remote from the computer 1300 (such as embodied within a storage area network (SAN)).

The computer 1300 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 1308, loaded into the memory 1306, and executed by the processor 1302.

The types of computer systems 1300 used by the entities of FIG. 1 can vary depending upon the embodiment and the processing power used by the entity. For example, a client device 115 may be a mobile phone with limited processing power, a small display 1318, and may lack a pointing device 1314. The server computer, in contrast, may comprise multiple blade servers working together to provide the functionality described herein.

Additional Considerations

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component.

Some portions of the above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

What is claimed is:

1. A computer-implemented method for maintaining data in a data management system, comprising:
   storing a set of documents in log-structured object store comprising sequence numbers and document value, the log-structured object store storing documents of the set of documents in a sorted order, the log-structured object store comprising an index for accessing a document given a sequence number;
   storing a log-structured merge tree, mapping keys to sequence numbers for accessing documents of the set of documents;
   receiving, from a client device, a query statement for querying a database that is managed by the data management system, the query statement specifying a key;
   searching the key in a cache memory;
   responsive to the key not found in the cache memory, searching for the key in the log-structured merge tree;
   obtaining a document sequence number by matching the key from the log-structured merge tree;
   obtaining a document value from a log-structured object store using the document sequence number, wherein the log-structured object store maintains documents sequence numbers and document values;
   returning the document value to the client device;
   storing in the cache memory a portion of the log-structured merge tree that maps the key to the sequence number and a portion of the index that maps the sequence number to the document value;
   responsive to receiving, from a second client device, a second query statement for querying the database specifying the key, searching the key in the cache memory; and
   responsive to the key found in the cache memory, obtaining the document sequence number based on the key from the cache memory.

2. The computer-implemented method of claim 1, wherein obtaining a document sequence number comprises performing a search through one or more levels of the log-structured merge tree for the key.

3. The computer-implemented method of claim 1, wherein the log-structured merge tree stores a plurality of sorted string tables, the computer-implemented method comprising:
   storing a bloom filter for each sorted string table; and
   determining based on the bloom filter whether a key exists in a sorted string table.

4. The computer-implemented method of claim 1, wherein the log-structured object store maintains documents sequence numbers and document values, the log-structured object store comprising a plurality of log segments.

5. The computer-implemented method of claim 1, further comprising:
   receiving one or more requests for updating documents;
   appending updated documents to a current log segment;
   responsive to a size of the current log segment exceeding a size threshold, marking the current log segment as immutable; and
   initializing a new log segment.

6. The computer-implemented method of claim 1, further comprising:
   maintaining a second log-structured merge tree storing sequence numbers of deleted documents and corresponding size per log segment;
   estimating a fragmentation in the log-structured object store by summing sizes of documents from the second log-structured merge tree; and
   responsive to the fragmentation exceeding a threshold, initiating a compaction operation.

7. The computer-implemented method of claim 1, further comprising:
   receiving, from a client device, a request to perform a mutation operation to a database that is managed by the data management system;
   inserting the mutation operation in a cache memory;
   maintaining a first list and a second list in the cache memory, wherein the first list is indexed by keys, and the second list is indexed by sequence numbers; and
   writing information describing the mutation operation in a write-ahead log.

8. The computer-implemented method of claim 7, further comprising:
   responsive to a number of records stored in the cache memory exceeding a threshold, storing content in the cache memory in a persistent storage, further comprising:
      converting key-value pairs into key index for the log-structured merge tree, and
      appending documents to a tail log-segment of a log-structured object store; and
   returning an indication to the client device that the mutation operation has successfully performed to the database.

9. A non-transitory computer readable storage medium storing instructions that when executed by one or more computer processors, cause the one or more computer processors to perform steps for maintaining data in a data management system, the steps comprising:
   storing a set of documents in log-structured object store comprising sequence numbers and document value, the log-structured object store storing documents of the set of documents in a sorted order, the log-structured object store comprising an index for accessing a document given a sequence number;
   storing a log-structured merge tree, mapping keys to sequence numbers for accessing documents of the set of documents;
   receiving, from a client device, a query statement for querying a database that is managed by the data management system, the query statement specifying a key;
   searching the key in a cache memory;

responsive to the key not found in the cache memory, searching for the key in the log-structured merge tree;

obtaining a document sequence number by matching the key from the log-structured merge tree;

obtaining a document value from a log-structured object store using the document sequence number, wherein the log-structured object store maintains documents sequence numbers and document values;

returning the document value to the client device;

storing in the cache memory a portion of the log-structured merge tree that maps the key to the sequence number and a portion of the index that maps the sequence number to the document value;

responsive to receiving, from a second client device, a second query statement for querying the database specifying the key, searching the key in the cache memory; and responsive to the key found in the cache memory, obtaining the document sequence number based on the key from the cache memory.

10. The non-transitory computer readable storage medium of claim 9, wherein obtaining a document sequence number comprises performing a search through one or more levels of the log-structured merge tree for the key.

11. The non-transitory computer readable storage medium of claim 9, wherein the log-structured merge tree stores a plurality of sorted string tables, the instructions further causing the one or more computer processors to perform steps comprising:

storing a bloom filter for each sorted string table; and
determining based on the bloom filter whether a key exists in a sorted string table.

12. The non-transitory computer readable storage medium of claim 9, wherein the log-structured object store maintains documents sequence numbers and document values, the log-structured object store comprising a plurality of log segments.

13. The non-transitory computer readable storage medium of claim 9, the instructions further causing the one or more computer processors to perform steps comprising:

receiving one or more requests for updating documents;
appending updated documents to a current log segment;
responsive to a size of the current log segment exceeding a size threshold, marking the current log segment as immutable; and
initializing a new log segment.

14. The non-transitory computer readable storage medium of claim 9, the instructions further causing the one or more computer processors to perform steps comprising:

maintaining a second log-structured merge tree storing sequence numbers of deleted documents and corresponding size per log segment;
estimating a fragmentation in the log-structured object store by summing sizes of documents from the second log-structured merge tree; and
responsive to the fragmentation exceeding a threshold, initiating a compaction operation.

15. The non-transitory computer readable storage medium of claim 9, the instructions further causing the one or more computer processors to perform steps comprising:

receiving, from a client device, a request to perform a mutation operation to a database that is managed by the data management system;
inserting the mutation operation in a cache memory;
maintaining a first list and a second list in the cache memory, wherein the first list is indexed by keys, and the second list is indexed by sequence numbers; and writing information describing the mutation operation in a write-ahead log.

16. The non-transitory computer readable storage medium of claim 15, the instructions further causing the one or more computer processors to perform steps comprising:

responsive to a number of records stored in the cache memory exceeding a threshold, storing content in the cache memory in a persistent storage, further comprising:

converting key-value pairs into key index for the log-structured merge tree, and
appending documents to a tail log-segment of a log-structured object store; and returning an indication to the client device that the mutation operation has successfully performed to the database.

17. A computer system comprising:

one or more computer processors; and
a non-transitory computer readable storage medium storing instructions that when executed by one or more computer processors, cause the one or more computer processors to perform steps for maintaining data in a data management system, the steps comprising:

storing a set of documents in log-structured object store comprising sequence numbers and document value, the log-structured object store storing documents of the set of documents in a sorted order, the log-structured object store comprising an index for accessing a document given a sequence number;

storing a log-structured merge tree, mapping keys to sequence numbers for accessing documents of the set of documents;

receiving, from a client device, a query statement for querying a database that is managed by the data management system, the query statement specifying a key;

searching the key in a cache memory;

responsive to the key not found in the cache memory, searching for the key in the log-structured merge tree;

obtaining a document sequence number by matching the key from the log-structured merge tree;

obtaining a document value from a log-structured object store using the document sequence number, wherein the log-structured object store maintains documents sequence numbers and document values;

returning the document value to the client device;

storing in the cache memory a portion of the log-structured merge tree that maps the key to the sequence number and a portion of the index that maps the sequence number to the document value;

responsive to receiving, from a second client device, a second query statement for querying the database specifying the key, searching the key in the cache memory; and responsive to the key found in the cache memory, obtaining the document sequence number based on the key from the cache memory.

18. The computer system of claim 17, the instructions further causing the one or more computer processors to perform steps comprising:

maintaining a second log-structured merge tree storing sequence numbers of deleted documents and corresponding size per log segment;
estimating a fragmentation in the log-structured object store by summing sizes of documents from the second log-structured merge tree; and responsive to the fragmentation exceeding a threshold, initiating a compaction operation.

19. The computer system of claim 17, the instructions further causing the one or more computer processors to perform steps comprising:
receiving, from a client device, a request to perform a mutation operation to a database that is managed by the data management system;
inserting the mutation operation in a cache memory;
maintaining a first list and a second list in the cache memory, wherein the first list is indexed by keys, and the second list is indexed by sequence numbers; and
writing information describing the mutation operation in a write-ahead log.

20. The computer system of claim 19, the instructions further causing the one or more computer processors to perform steps comprising:
responsive to a number of records stored in the cache memory exceeding a threshold, storing content in the cache memory in a persistent storage, further comprising:
converting key-value pairs into key index for the log-structured merge tree, and
appending documents to a tail log-segment of a log-structured object store; and
returning an indication to the client device that the mutation operation has successfully performed to the database.

\* \* \* \* \*